United States Patent [19]

Shinomiya et al.

[11] Patent Number: 5,077,145

[45] Date of Patent: Dec. 31, 1991

[54] PHOSPHOR FOR X-RAY INTENSIFYING SCREEN AND X-RAY INTENSIFYING SCREEN

[75] Inventors: Genichi Shinomiya; Satoru Chikutei; Takatoshi Minamidani, all of Anan, Japan

[73] Assignee: Nichia Kagaku Kogyo K.K., Anan, Japan

[21] Appl. No.: 632,093

[22] Filed: Dec. 21, 1990

[30] Foreign Application Priority Data

Dec. 26, 1989 [JP] Japan ................ 1-334783

[51] Int. Cl.$^5$ ............................................ C09K 11/78
[52] U.S. Cl. ................................ 428/691; 250/483.1; 250/486.1; 252/301.4 H; 252/301.4 R; 252/301.6 R
[58] Field of Search ............... 252/301.4 H, 301.4 R, 252/301.6 R; 250/483.1, 486.1; 428/691

[56] References Cited

U.S. PATENT DOCUMENTS

| | | | |
|---|---|---|---|
| 4,011,455 | 3/1977 | Waller et al. | 250/486 |
| 4,054,799 | 10/1977 | Wolfe et al. | 252/301.4 H |
| 4,088,894 | 5/1978 | Rabatin | 252/301.4 H |
| 4,387,141 | 4/1983 | Patten | 428/690 |
| 4,431,922 | 12/1984 | Patten | 250/486.1 |
| 4,829,188 | 7/1989 | Shinomiya et al. | 250/483.1 |
| 4,839,243 | 6/1989 | Shimizu et al. | 252/301.4 R |
| 4,857,741 | 8/1989 | Yokota et al. | 252/301.4 R |
| 4,959,174 | 9/1990 | Nakajima et al. | 252/301.4 R |

FOREIGN PATENT DOCUMENTS 3151 7/1979 European Pat. Off. ..... 252/301.4 H

*Primary Examiner*—Jack Cooper
*Attorney, Agent, or Firm*—Nixon & Vanderhye

[57] ABSTRACT

A phosphor for an X-ray intensifying screen contains a phosphor mixture of a phosphor represented by BaFBr:mEu$^{2+}$($5\times10^{-4} \leq m \leq 5\times10^{-2}$), and a phosphor represented by $Y_{1-2/3x}M^xTaO_4$:nNb ($10^{-5} \leq x \leq 1$, $0 \leq n \leq 0.05$, and M is at least one member selected from the group consisting of Ca, Sr, and Cd). An X-ray intensifying screen includes a support and a phosphor layer formed on the support and containing the above phosphor. When this X-ray intensifying screen is used, an X-ray image producing less crossover light and having high graininess and sharpness can be obtained. An exposure amount of an object to be examined can be reduced in medical radiophotography, and radiation diagnostic performance can be improved.

9 Claims, 4 Drawing Sheets

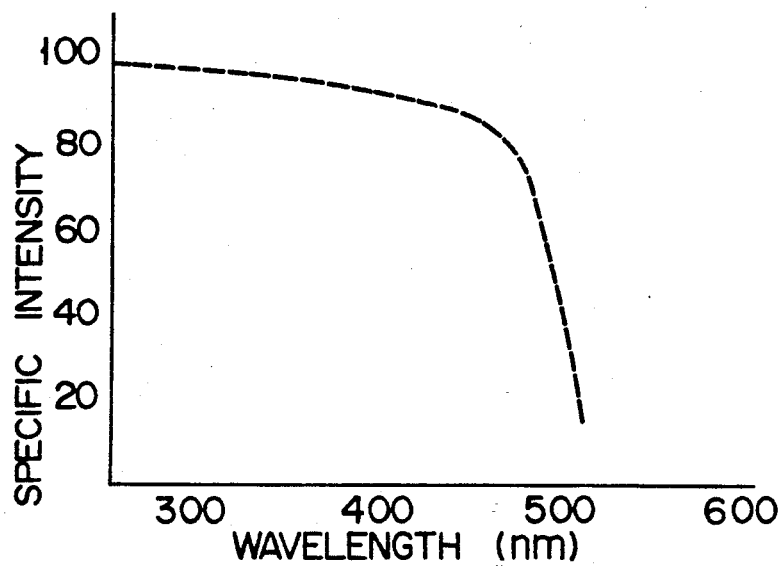
F I G. 1
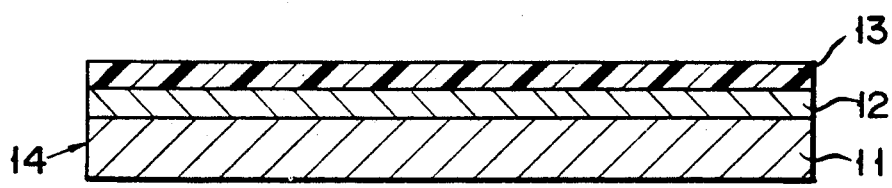
F I G. 5

PHOSPHOR FOR X-RAY INTENSIFYING SCREEN AND X-RAY INTENSIFYING SCREEN

BACKGROUND OF THE INVENTION

1. Field of the Invention

The present invention relates to an X-ray intensifying screen and a phosphor for an X-ray intensifying screen used in medical radiography or industrial radiography.

2. Description of the Related Art

An X-ray intensifying screen generally improves sensitivity of a photosensitive material for use in medical radiography when it is used in combination with an X-ray film. This X-ray intensifying screen generally comprises an intensifying screen base, a phosphor layer coated on the intensifying screen base and containing an organic binder and a phosphor, and a transparent protective film having a thickness of about 10 µm for covering the phosphor layer. An X-ray film is sandwiched between a pair of two sheets of the X-ray intensifying screen so that a photosensitive emulsion layer formed on each side of the X-ray film and having a thickness of about 20 to 30 µm is brought into contact with the protective film of the X-ray intensifying screen. In order to improve sharpness of an X-ray image, it is important that the X-ray film and the intensifying screen are in tight contact with each other.

A phosphor for use in the X-ray intensifying screen of this type is required to have a high luminous efficiency, a large X-ray absorption amount, and an emission spectrum suitable for spectral sensitivity of an X-ray film.

In general, an X-ray intensifying screen coated with a phosphor having a large X-ray absorption amount has good graininess of an X-ray image and improves diagnostic performance in medical radiography. In addition, when a phosphor having a high luminous efficiency is used, sensitivity of a photosensitive material is increased. Since, therefore, photography can be performed with even a small X-ray radiation amount, an exposure amount of an object to be examined can be reduced.

If an emission spectrum is unsuitable for spectral sensitivity of an X-ray film, a part of light emitted from an X-ray phosphor is not absorbed by a photosensitive emulsion layer coated on the input side of the film but scattered and transmitted. This scattered and transmitted light produces light to be absorbed by an emulsion layer on the opposite side, i.e., so-called crossover light, thereby reducing sharpness of X-rays.

In order to obtain a high-quality image, therefore, it is essential to improve three factors of sharpness, graininess, and sensitivity. For example, however, when sensitivity is increased, sharpness and graininess are decreased. Therefore, it is very difficult to maintain all of the three factors at high level.

SUMMARY OF THE INVENTION

The present invention has been made in consideration of the above situation and has as its object to provide a phosphor for an X-ray intensifying screen capable of forming an X-ray image having high sensitivity, high sharpness, and high graininess.

It is another object of the present invention to provide an X-ray intensifying screen capable of obtaining an X-ray image having high sensitivity, high sharpness, and high graininess.

According to an aspect of the present invention, there is provided a phosphor for an X-ray intensifying screen containing a phosphor mixture of a phosphor represented by $BaFBr:mEu^{2+} (5 \times 10^{-4} \leq m \leq 5 \times 10^{-2})$ and a phosphor represented by $Y_{-2/3x}M_xTaO_4:nNb$ ($10^{-5} \leq x \leq 1, 0 \leq n \leq 0.05$, and M is at least one member selected from the group consisting of Ca, Sr, and Cd).

According to another aspect of the present invention, there is provided an X-ray intensifying screen comprising a support and a phosphor layer formed on the support, wherein the phosphor layer contains a phosphor mixture of a phosphor represented by $BaFBr:mEu^{2+}(5 \times 10^{-4} \leq m \leq 5 \times 10^{-2})$ and a phosphor represented by $Y_{1-2/3x}M_xTaO_4:nNb$ ($10^{-5} \leq x \leq 1$, $0 \leq n \leq 0.05$, and M is at least one member selected from the group consisting of Ca, Sr, and Cd).

Since the phosphor according to the present invention has good X-ray absorption characteristics and a high luminous efficiency, sensitivity of a photosensitive material can be increased. When an X-ray intensifying screen containing such a phosphor is used, since an amount of X-rays to be radiated can be reduced, an exposure amount of an object to be examined can be reduced in radiography.

In addition, an emission spectrum of the phosphor according to the present invention is concentrated in a wavelength range (ultraviolet to 490 nm) in which silver bromide used as a negative emulsion of an X-ray film exhibits a high absorption rate. That is, an amount of long-wavelength emission of 490 nm or more is small while an amount of short-wavelength emission of 380 nm or less is large. For this reason, emission of this phosphor has a low scattering/transmission rate in silver bromide. When the phosphor of the present invention is used in the X-ray intensifying screen, therefore, an X-ray image producing less crossover light and having high graininess and sharpness can be obtained. As a result, radiation diagnostic performance is improved.

As described above, when the phosphor of the present invention and the X-ray intensifying screen using this phosphor are used, an image in which sensitivity, graininess, and sharpness are harmonized at high level can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a graph showing a spectral sensitivity curve of an X-ray film;

FIG. 5 is a sectional view showing an arrangement of an X-ray intensifying screen using the phosphor of the present invention.

DETAILED DESCRIPTION OF THE PREFERRED EMBODIMENTS

Figure 2:
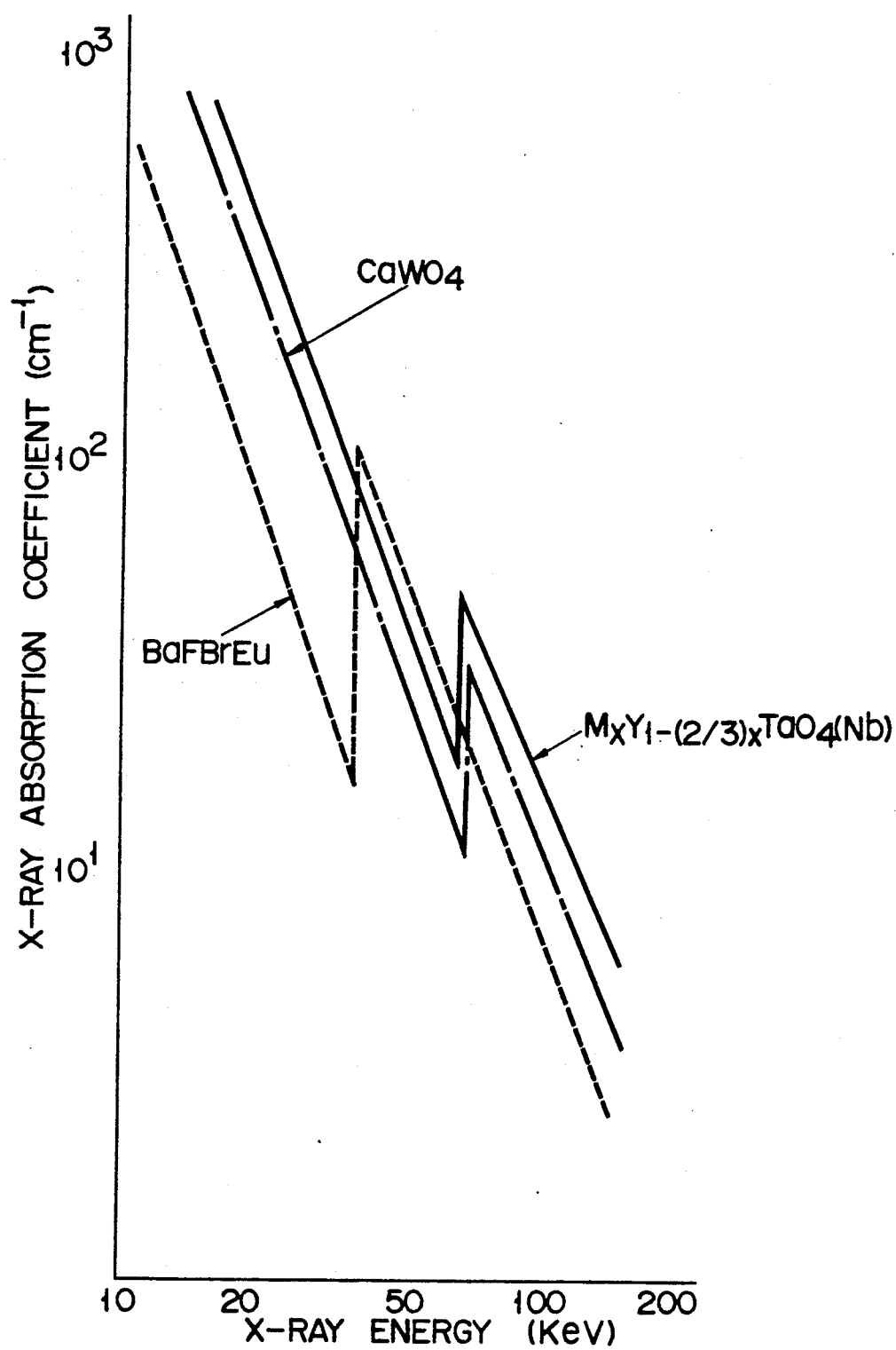
FIG. 2 is a graph showing X-ray absorption coefficients of a BaFBr:mEu phosphor and a $Y_{1-2/3x}M_x\text{-}TaO_4:nNb$ phosphor used in the present invention and that of a conventional $CaWO_4$ phosphor.

A phosphor for an X-ray intensifying screen according to the present invention contains a phosphor mixture of a phosphor represented by BaFBr:mEu$^{2+}$ ($5\times10^{-4} \leq m \leq 5\times10^{-2}$) and a phosphor represented by Y$_{1-2/3x}$M$_x$TaO$_4$:nNb ($10^{-5} \leq x \leq 1$, $0 \leq n \leq 0.05$, and M is at least one member selected from the group consisting of Ca, Sr, and Cd).

In addition, the X-ray intensifying screen of the present invention comprises a support and a phosphor layer formed on the support and containing the phosphor mixture described above.

A mixing weight ratio of the BaFBr:mEu$^{2+}$ phosphor to the Y$_{1-2/3x}$M$_x$TaO$_4$:nNb phosphor is preferably 5/95 to 90/10.

If the value of m is less than $5\times10^{-4}$, an afterglow amount is increased, and an image remains on the X-ray intensifying screen used in succession to produce a fog in a newly photographed image. If the value exceeds $5\times10^{-2}$, although the afterglow amount is small, an activating agent becomes excessive to cause concentration quenching. In addition, excessive use of expensive Eu increases manufacturing cost. The value of m is preferably $3\times10^{-3} \leq m \leq 3\times10^{-2}$.

If the value of x is less than $10^{-5}$, the afterglow amount is increased to decrease a luminous efficiency. If the value exceed 1, the luminous efficiency is decreased. The value of x is preferably $1\times10^{-3} \leq x \leq 1\times10^{-2}$.

If the value of n exceeds 0.05, the luminous efficiency is decreased. The value of n is preferably $0 \leq n \leq 0.02$.

The phosphor according to the present invention has good X-ray absorption characteristics and a high luminous efficiency. In addition, an emission spectrum of the phosphor is concentrated in a wavelength range (ultraviolet to 490 nm) in which silver bromide used as a negative emulsion of an X-ray film exhibits a high absorption rate. That is, an amount of long-wavelength emission of 490 nm or more is small while an amount of short-wavelength emission of 380 nm or less is large. Wavelength dependencies of scattering, transmission, and absorption rates of this silver bromide are summarized in Table 1.

TABLE 1

| Wavelength (nm) | Scattering (%) | Transmission (%) | Absorption (%) |
|---|---|---|---|
| 365 | 12 | 4 | 84 |
| 405 | 23 | 8 | 69 |
| 436 | 41 | 11 | 48 |
| 490 | 60 | 20 | 20 |
| 546 | 61 | 24 | 15 |
| 615 | 59 | 29 | 12 |

As is apparent from Table 1, emission at a long wavelength of 490 nm or more has a low absorption rate and high scattering and transmission rates with respect to silver bromide. To the contrary, emission at a short wavelength of 380 nm or less has a very high absorption rate and low scattering and transmission rates with respect to silver bromide. When the phosphor of the present invention is used in X-ray intensifying screen, therefore, an X-ray image producing less crossover light and having high sharpness can be obtained. As a result, radiation diagnostic performance is improved.

FIG. 1 shows spectral sensitivity of a X-ray film. As is apparent from FIG. 1, an X-ray film has high spectral sensitivity at a wavelength of 490 nm or less. Therefore, the phosphor of the present invention in which emission energy is concentrated in a short wavelength of 490 nm or less has sensitivity much higher than that of a conventional CaWO$_4$ phosphor. FIG. 2 is a graph comparing X-ray absorption coefficients of the BaFBr:mEu$^{2+}$ phosphor and the Y$_{1-2/3x}$M$_x$TaO$_4$:nNb phosphor used in the present invention with that of the conventional CaWO$_4$ phosphor. This graph reveals that the X-ray absorption amounts of the BaFBr:mEu$^{2+}$ phosphor and the Y$_{1-2/3x}$M$_x$TaO$_4$:nNb phosphor used in the present invention are larger than that of the CaWO$_4$ phosphor in an energy region (50 to 130 keV) of X-rays used in normal radiography.

As described above, the phosphor of the present invention has good X-ray absorption characteristics and a high luminous efficiency. Therefore, sensitivity of a photosensitive material is increased. In addition, when the X-ray intensifying screen containing this phosphor is used, an amount of X-rays to be radiated can be reduced. As a result, an exposure amount of an object to be examined can be reduced in medical radiation photography. That is, in the phosphor according to the present invention, since three factors of sensitivity, graininess, and sharpness which are contradictory in a conventional phosphor are adjusted at high level, a high-quality X-ray image can be obtained.

Furthermore, by performing radiophotography by using intensifying screen containing the phosphor of the present invention, an image producing less crossover light and having high graininess and sharpness can be obtained.

The present invention will be described in more detail below by way of its examples.

EXAMPLES 1-3

7.6 kg of barium carbonate, 48.4 kg of europium oxide, and 8.52 kg of hydrobromic acid (47 wt %) were added to 2.3 l of pure water to prepare a suspension consisting of a mixture of barium bromide and barium carbonate. Subsequently, the prepared suspension was heated up to 80° C, and 1.1 kg of hydrofluoric acid (50 wt %) were added to the suspension. Thereafter, the resultant suspension was sufficiently stirred and reacted for two hours. After the reaction, nonreacted barium bromide was removed, and the resultant material was dried to obtain 6.55 kg of a mixture of barium fluorobromide and europium fluoride.

6 g of ammonium bromide and 50 mg of sodium bromide were added to 2 kg of the material mixture obtained as described above, and the resultant material was sufficiently mixed. Thereafter, the mixed material was filled in a quartz tray and fired in a carbon dioxide atmosphere containing carbon monoxide at a temperature of 880° C. for two hours and 30 minutes to obtain a fired body. The obtained fired body was milled by a ball mill, and 20 g of silicon dioxide were added to and sufficiently mixed with 2 kg of an obtained milled body. The resultant mixture was filled in a quartz tray and re-fired in an electric furnace. The re-firing was performed in a carbon dioxide atmosphere containing carbon monoxide at a temperature of 740° C. for four hours. The obtained fired body was washed with methanol and dried to obtain divalent europium-activated barium fluorobromide phosphor (BaFBr:0.01Eu$^{2+}$).

Subsequently, 111.78 g of yttrium oxide, 2.21 g of strontium carbonate, 218.74 g of tantalum pentoxide, and 1.33 g of niobium pentoxide were used as raw materials, 25 g of lithium chloride as a flux were mixed in the raw materials, and the resultant material mixture was milled and mixed by a ball mill. The obtained material mixture was filled in an alumina crucible and fired in the air at a temperature of 1,200° C. for 10 hours. The resultant fired body was milled by a ball mill, repeatedly washed with pure water five times by decantation, and suction-filtered. The resultant material was dried at 120° C. for 15 hours to obtain an $Sr_{0.015}Y_{0.99}TaO_4{:}0.01Nb$ phosphor.

The $BaFBr{:}0.01Eu^{2+}$ phosphor and the $Sr_{0.015}Y_{0.99}TaO_4{:}0.01Nb$ phosphor formed as described above were used to prepare phosphor mixtures of Examples 1 to 3 below.

|  | $BaFBr{:}0.01Eu^{2+}$ phosphor (wt %) | $Sr_{0.015}Y_{0.99}TaO_4{:}0.01Nb$ phosphor (wt %) |
| --- | --- | --- |
| Example 1 | 80 | 20 |
| Example 2 | 50 | 50 |
| Example 3 | 20 | 80 |

Figure 3:
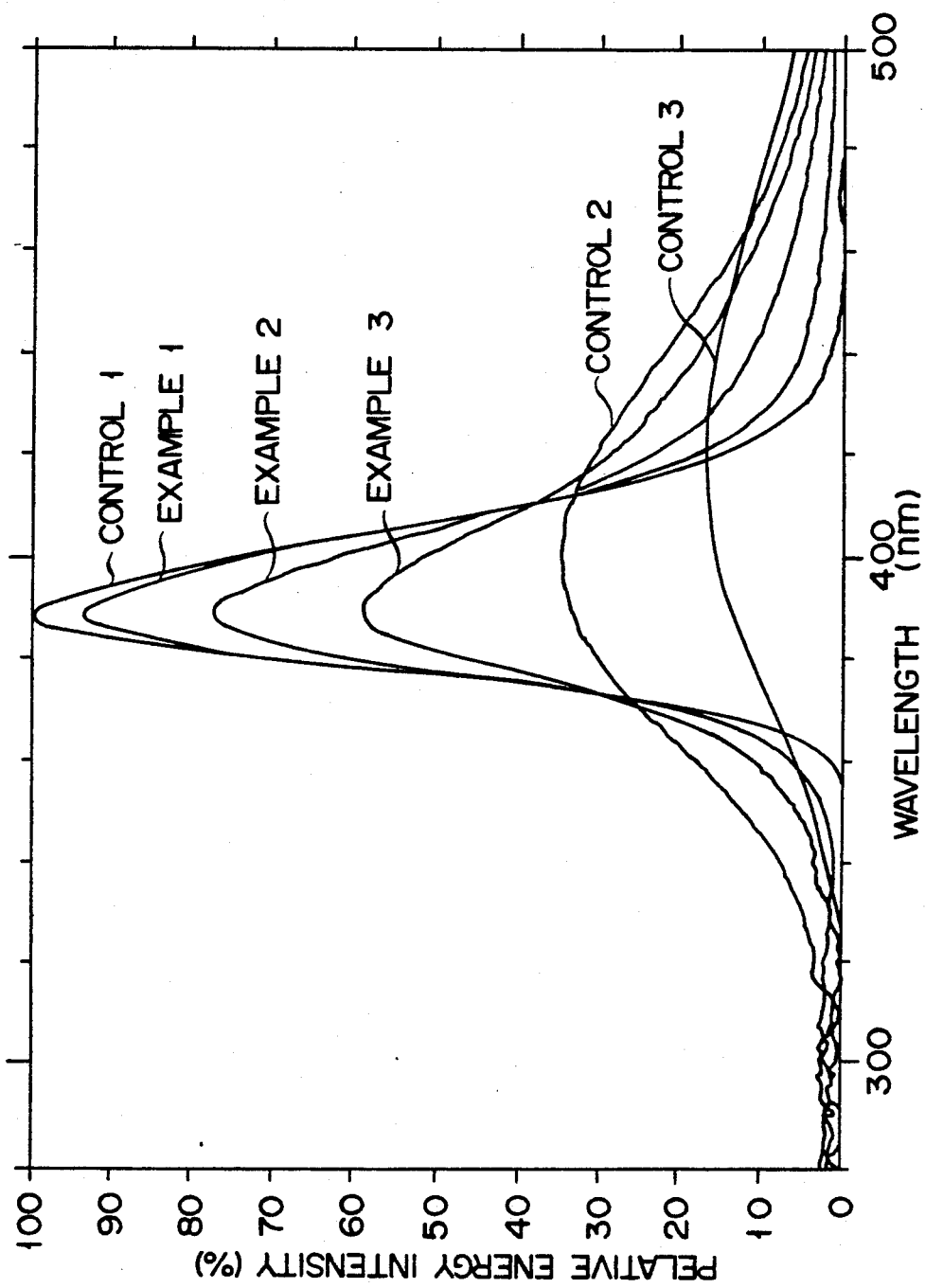
FIGS. 3 and 4 are graphs showing relative energy distributions of conventional phosphors and phosphors used in the present invention.

Relative energy intensity of an emission spectrum with respect to a wavelength was measured for each of the above phosphor mixtures and a $BaFBr{:}0.01Eu^{2+}$ phosphor (Control 1), an $Sr_{0.015}Y_{0.99}TaO_4{:}0.01Nb$ phosphor (Control 2), and a $CaWO_4$ phosphor (Control 3). The measured emission spectrum energy distributions are shown in FIG. 3. Note that the reactive energy intensity was measured at a voltage of 50 V by using an X-ray tube having a Cu target and an Al filter (3 mm) as an X-ray source.

Subsequently, each phosphor was used to manufacture X-ray intensifying screen 14 having a support 11 and a phosphor layer 12 formed on the support 11 as shown in FIG. 5.

92 parts by weight of phosphor grains and 8 parts by weight of a linear polyester resin were mixed, and methylethylketone was added to the mixture. Nitrocellulose having a nitration degree of 11.5% was added to the resultant mixture to prepare a phosphor dispersion. Diethyl phthalate, phthalic acid, and methylethylketone were added to the prepared phosphor dispersion, and the resultant solution was sufficiently stirred and mixed by using a homogenizer, thereby preparing a phosphor coating solution having a mixing ratio of a binder to a phosphor of 1:10 and a viscosity of 30 Pas (25° C.). A titanium dioxide-incorporated polyester sheet (thickness=200 μm) as a support 11 was horizontally placed on a glass plate, and the prepared coating solution was uniformly coated on the support 11 by using a doctor blade and naturally dried. The coated solution was further dried in a dryer at a temperature of 60° C. for eight hours to form a phosphor layer having a thickness of 70 to 100 μm on the support 11. A transparent polyethylene film was adhered on the formed phosphor layer 12 by using a polyester-based adhesive to form a transparent protective film 13 (thickness=10 μm), thereby obtaining an intensifying screen.

Relative sensitivity, graininess, and sharpness MTF (Modulation Transfer Function) of the obtained intensifying screen 14 were measured by using an X-ray film CHRONEX10 (tradename: available from Du Pont de Nemours, E.I., Co.) The measurement results are summarized in Table 2 below. The sharpness is represented by an MTF value obtained at a spacial frequency of 3 LP/mm.

TABLE 2

| Intensifying Screen No. | Used Phosphor | | Film | | Photographic Characteristics | |
| --- | --- | --- | --- | --- | --- | --- |
| | Composition | Average Grain Size (μm) | Thickness (μm) | Relative Sensitivity | Graininess (RMS) | Sharpness (MTF) |
| Example 1 | $BaFBr{:}Eu/Sr_{0.015}Y_{0.99}TaO_4{:}Nb = 8/2$ | 3.0 | 95 | 420 | $8.53 \times 10^{-2}$ | 0.37 |
| Example 2 | $BaFBr{:}Eu/Sr_{0.015}Y_{0.99}TaO_4{:}Nb = 5/5$ | 3.4 | 90 | 380 | $5.35 \times 10^{-2}$ | 0.35 |
| Example 3 | $BaFBr{:}Eu/Sr_{0.015}Y_{0.99}TaO_4{:}Nb = 2/8$ | 3.8 | 85 | 310 | $2.56 \times 10^{-2}$ | 0.32 |
| Control 1 | $BaFBr{:}Eu$ | 2.8 | 100 | 450 | $1.10 \times 10^{-1}$ | 0.38 |
| Control 2 | $Sr_{0.015}Y_{0.99}TaO_4{:}Nb$ | 4.0 | 80 | 250 | $1.24 \times 10^{-2}$ | 0.30 |
| Control 3 | $CaWO_4$ | 5.6 | 70 | 100 | $6.52 \times 10^{-3}$ | 0.28 |

EXAMPLES 4–6

333.9 g of an $Sr_{0.002}Y_{0.9987}TaO_4$ phosphor were prepared following the same procedures as in Example 1 except that 112.76 g of yttrium oxide, 0.30 g of strontium carbonate, and 220.95 g of tantalum pentoxide were used as raw materials. The prepared phosphor and a $BaFBr{:}0.01Eu^{2+}$ phosphor prepared following the same procedures as in Example 1 were mixed at the following ratios.

|  | $BaFBr{:}0.01Eu^{2+}$ phosphor (wt %) | $Sr_{0.002}Y_{0.9987}TaO_4$ phosphor (wt %) |
| --- | --- | --- |
| Example 5 | 50 | 50 |
| Example 6 | 20 | 80 |

Figure 4:
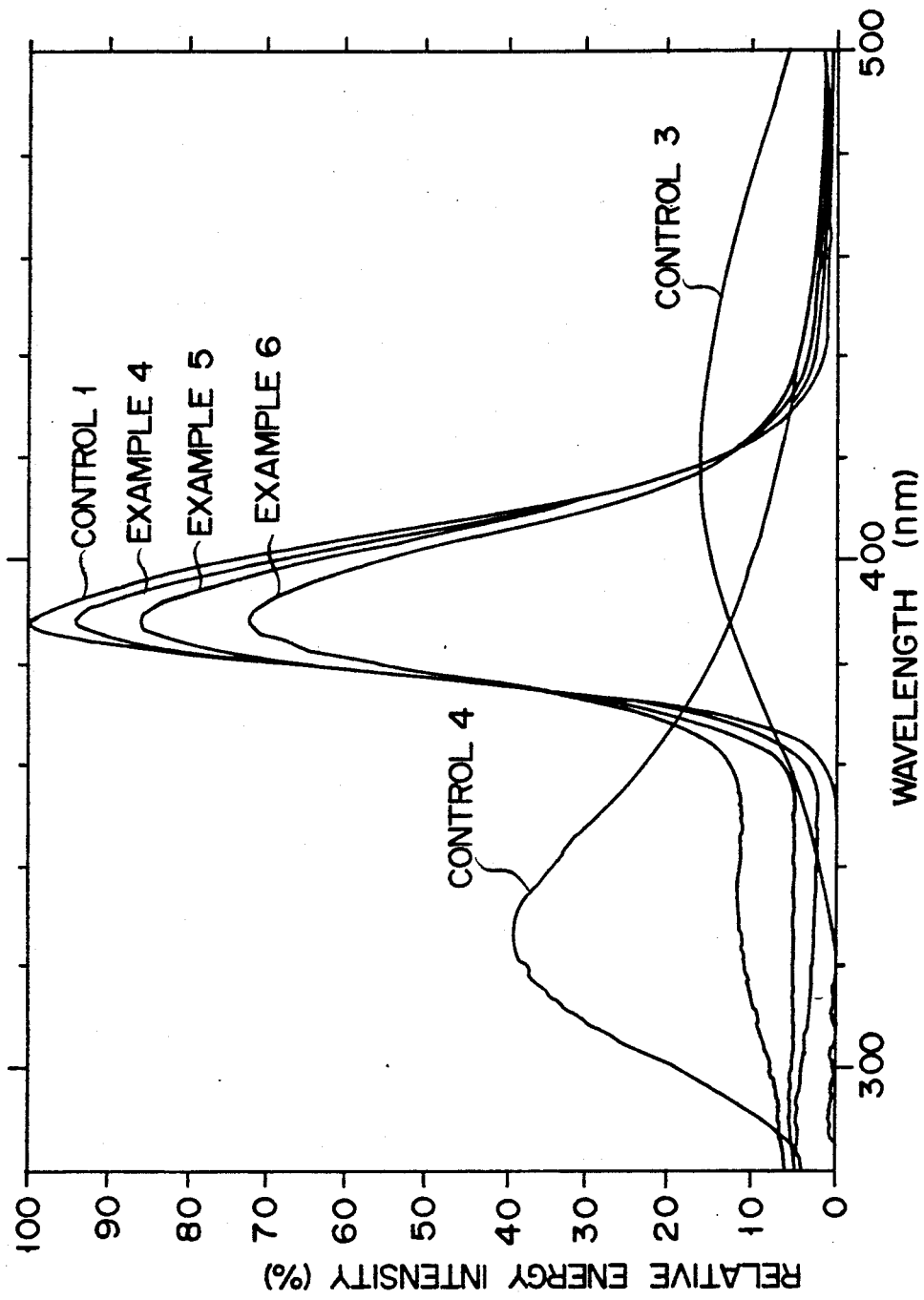

Following the same procedures as in Example 1, relative energy intensity of an emission spectrum with respect to a wavelength was measured for each of the above phosphor mixtures and an $Sr_{0.002}Y_{0.9987}TaO_4$ phosphor (Control 4). FIG. 4 shows energy distributions of these emission spectrums and those of emission spectrums of Controls 1 and 3 for comparison.

Subsequently, these phosphors were used to manufacture an X-ray intensifying screen following the same procedures as in Example 1. Relative sensitivity, graininess, and sharpness (MTF) of each obtained intensifying screen were measured by using an X-ray film CHRONEX10 (tradename: available from Du Pont de Nemours, E.I., Co.) The measurement results are summarized in Table 3.

TABLE 3

| Intensifying Screen No. | Used Phosphor Composition | Average Grain Size (μm) | Film Thickness (μm) | Photographic Characteristics | | |
|---|---|---|---|---|---|---|
| | | | | Relative Sensitivity | Grainness (RMS) | Sharpness (MTF) |
| Example 4 | BaFBr:Eu/$Sr_{0.015}Y_{0.99}TaO_4$ = 8/2 | 3.1 | 95 | 410 | $8.03 \times 10^{-2}$ | 0.39 |
| Example 5 | BaFBr:Eu/$Sr_{0.015}Y_{0.99}TaO_4$ = 5/5 | 3.5 | 90 | 340 | $4.87 \times 10^{-2}$ | 0.40 |
| Example 6 | BaFBr:Eu/$Sr_{0.015}Y_{0.99}TaO_4$ = 2/8 | 3.9 | 85 | 260 | $2.39 \times 10^{-2}$ | 0.42 |
| Control 4 | $Sr_{0.02}Y_{0.9987}TaO_4$ | 4.2 | 75 | 195 | $1.05 \times 10^{-2}$ | 0.42 |

As is apparent from FIGS. 3 and 4, each of the phosphors (Examples 1, 2, 3, 4, 5, and 6) of the present invention and the BaFBr:0.01$Eu^{2+}$ phosphor of Control 1 produces less long-wavelength emission at a wavelength of 490 nm or more than those of the $CaWO_4$ phosphor of Control 3, the $Sr_{0.015}Y_{0.99}TaO_4$:0.01Nb phosphor of Control 2, and the $Sr_{0.002}Y_{0.9987}TaO_4$ phosphor of Control 4. An X-ray film normally has a spectral sensitivity curve as shown in FIG. 1, and its energy is concentrated in a short wavelength of 490 nm or less. Each of the phosphors of the present invention and the phosphor of Control 1, therefore, has a large X-ray absorption amount and an emission spectrum suitable for spectral sensitivity of an X-ray film. As shown in Tables 2 and 3, however, although the BaFBr:0.01$Eu^{2+}$ phosphor of Control 1 has high sensitivity and sharpness, its image graininess is poor. Therefore, this phosphor is practically unsatisfactory. To the contrary, the phosphor of the present invention, i.e., the phosphor mixture of the BaFBr:0.01$Eu^{2+}$ phosphor and the $Sr_{0.015}Y_{0.99}TaO_4$:0.01Nb phosphor or the phosphor mixture of the BaFBr:0.01$Eu^{2+}$ phosphor and the $Sr_{0.002}Y_{0.9987}TaO_4$ phosphor has good image characteristics in any of relative sensitivity, graininess, and sharpness.

EXAMPLE 7-9

332.41 g of a $Ca_{0.075}Y_{0.95}TaO_4$ phosphor was prepared following the same procedures as in Example 1 except that 107.26 g of yttrium oxide, 7.51 g calcium carbonate, and 220.95 g of tantalum pentoxide were used as raw materials. The prepared phosphor and aBaFBr:0.01$Eu^{2+}$ phosphor prepared following the same procedures as in Example 1 were mixed at the following mixing ratios to prepare phosphor mixtures of Examples 7 to 9.

| | BaFBr:0.01$Eu^{2+}$ phosphor (wt %) | $Ca_{0.075}Y_{0.95}TaO_4$ phosphor (wt %) |
|---|---|---|
| Example 7 | 70 | 30 |
| Example 8 | 50 | 50 |
| Example 9 | 30 | 70 |

Following the same procedures as in Example 1, these phosphor mixtures and a $Ca_{0.075}Y_{0.95}TaO_4$ phosphor as Control 5 were used to manufacture an X-ray intensifying screen.

Relative sensitivity, graininess, and sharpness (MTF) of each obtained intensifying screen were measured following the same procedures as in Examples 1 to 3. The measurement results are summarized in Table 4 below.

TABLE 4

| Intensifying Screen No. | Used Phosphor Composition | Average Grain Size (μm) | Film Thickness (μm) | Photographic Characteristics | | |
|---|---|---|---|---|---|---|
| | | | | Relative Sensitivity | Grainness (RMS) | Sharpness (MTF) |
| Control 1 | $Ca_{0.075}Y_{0.95}TaO_4$ | 4.5 | 70 | 180 | $9.94 \times 10^{-3}$ | 0.41 |
| Example 1 | BaFBr:$Eu^{2+}$/$Ca_{0.075}Y_{0.95}O_4$ = 1/3 | 3.3 | 92 | 405 | $7.90 \times 10^{-2}$ | 0.38 |
| Example 2 | BaFBr:$Eu^{2+}$/$Ca_{0.075}Y_{0.95}O_4$ = 5/5 | 3.7 | 88 | 325 | $4.96 \times 10^{-2}$ | 0.37 |
| Example 3 | BaFBr:$Eu^{2+}$/$Ca_{0.075}Y_{0.95}O_4$ = 3/7 | 4.0 | 81 | 245 | $2.27 \times 10^{-2}$ | 0.40 |

EXAMPLE 10-12

341.82 g of a $Cd_{0.15}Y_{0.90}TaO_4$ phosphor were prepared following the same procedures as in Example 1 except that 101.62 g of yttrium oxide, 25.86 g of cadmium carbonate, and 220.95 g of tantalum pentoxide were used as raw materials.

Subsequently, 6.52 kg of a BaFBr:0.003$Eu^{2+}$ phosphor were prepared following the same procedures as in Example 1 except that 14.5 g of europium oxide, 7.6 kg of barium carbonate, 8.52 kg of hydrobromic acid (47 wt %), and 1.1 kg of hydrofluoric acid (50 wt %) were used as raw materials.

The prepared two types of phosphors were mixed at the following mixing ratios.

| | BaFBr:0.003$Eu^{2+}$ phosphor (wt %) | $Ca_{0.15}Y_{0.90}TaO_4$ phosphor (wt %) |
|---|---|---|
| Example 10 | 70 | 30 |
| Example 11 | 50 | 50 |
| Example 12 | 30 | 70 |

Following the same procedures as in Example 1, these phosphor mixtures, a BaFBr:0.003$Eu^{2+}$ phosphor as Control 6, and a $Ca_{0.15}Y_{0.90}TaO_4$ phosphor as Control 7 were used to manufacture an X-ray intensifying screen.

Relative sensitivity, graininess, and sharpness (MTF) of each obtained intensifying screen were measured following the same procedures as in Examples 1 to 3. The measurement results are summarized in Table 5 below.

TABLE 5

| Intensifying Screen No. | Used Phosphor Composition | Average Grain Size (μm) | Film Thickness (μm) | Photographic Characteristics | | |
|---|---|---|---|---|---|---|
| | | | | Relative Sensitivity | Graininess (RMS) | Sharpness (MTF) |
| Control 6 | BaFBr:0.003Eu$^{2+}$ | 2.8 | 100 | 450 | $1.05 \times 10^{-1}$ | 0.37 |
| Control 7 | Cd$_{0.15}$Y$_{0.90}$TaO$_4$ | 4.2 | 75 | 201 | $1.01 \times 10^{-2}$ | 0.42 |
| Example 10 | BaFBr:Eu$^{2+}$/Cd$_{0.15}$Y$_{0.90}$TaO$_4$ = 7/3 | 3.1 | 95 | 402 | $7.52 \times 10^{-2}$ | 0.37 |
| Example 11 | BaFBr:Eu$^{2+}$/Cd$_{0.15}$Y$_{0.90}$TaO$_4$ = 5/5 | 3.5 | 91 | 345 | $5.01 \times 10^{-2}$ | 0.39 |
| Example 12 | BaFBr:Eu$^{2+}$/Cd$_{0.15}$Y$_{0.90}$TaO$_4$ = 3/7 | 3.9 | 85 | 263 | $2.18 \times 10^{-2}$ | 0.41 |

As is apparent from Table 4, while each phosphor of Examples 7 to 9 has good characteristics in any of relative sensitivity, graininess, and sharpness, the Ca$_{0.075}$Y$_{0.95}$TaO$_4$ phosphor of Control 5 has practically unsatisfactory characteristics in relative sensitivity and graininess as compared with those of Examples 7 to 9. In addition, as is apparent from Table 5, Examples 10 to 12 are good in any of relative sensitivity, graininess, and sharpness. Control 6, however, is good in relative sensitivity and sharpness but is practically unsatisfactory in graininess, and Control 7 is good in graininess and sharpness but is practically unsatisfactory in relative sensitivity.

Additional advantages and modifications will readily occur to those skilled in the art. Therefore, the invention in its broader aspects is not limited to the specific details, representative Articles, and illustrated examples shown and described. Accordingly, various modifications may be made without departing from the spirit or scope of the general inventive concept as defined by the appended claims and their equivalents.

What is claimed is:

1. A phosphor for an X-ray intensifying screen containing a mixture of a phosphor represented by BaFBr:mEu$^{2+}$($5 \times 10^{-4} \leq m \leq 5 \times 10^{-2}$), and a phosphor represented by Y$_{1-2/3x}$M$_x$TaO$_4$:nNb ($10^{-5} \leq x \leq 1$, $0 \leq n \leq 0.05$, and M is at least one member selected from the group consisting of Ca, Sr, and Cd) in a weight ratio of said BaFBr:mEu$^{2+}$ phosphor to said Y$_{1-2/3x}$M$_x$TaO$_4$:nNb phosphor of 5/95 to 90/10.

2. A phosphor according to claim 1, wherein said M is Sr.

3. A phosphor according to claim 1, wherein said M is Ca.

4. A phosphor according to claim 1, wherein said M is Cd.

5. An X-ray intensifying screen comprising:
a support; and
a phosphor layer formed on said support,
wherein said phosphor layer contains a mixture of a phosphor represented by BaFBr:mEu$^{2+}$($5 \times 10^{-4} \leq m \leq 5 \times 10^{-2}$), and a phosphor represented by Y$_{1-2/3x}$M$_x$TaO$_4$:nNb ($10^{-5} \leq x \leq 1$, $0 \leq n \leq 0.05$, and M is at least one member selected from the group consisting of Ca, Sr, and Cd) in a weight ratio of said BaFBr:mEu$^{2+}$ phosphor to said Y$_{1-2/3x}$M$_x$TaO$_4$:nNb phosphor of 5/95 to 90/10.

6. An X-ray intensifying screen according to claim 5, wherein said M is Sr.

7. An X-ray intensifying screen according to claim 5, wherein said M is Ca.

8. An X-ray intensifying screen according to claim 5, wherein said M is Cd.

9. An X-ray intensifying screen according to claim 5, wherein a protective layer of polyethylene is formed on said phosphor layer.

* * * * *